(12) United States Patent
Tong et al.

(10) Patent No.: US 10,165,502 B2
(45) Date of Patent: Dec. 25, 2018

(54) ASYNCHRONOUS INFORMATION TRANSFER BETWEEN DEVICES ON DIFFERENT NETWORKS VIA A PLURALITY OF PROVIDER DEVICES

(71) Applicant: Accenture Global Services Limited, Dublin (IE)

(72) Inventors: Alwin Tong, Sunnyside, NY (US); Roman Kalantari, Brooklyn, NY (US)

(73) Assignee: Accenture Global Services Limited, Dublin (IE)

( * ) Notice: Subject to any disclaimer, the term of this patent is extended or adjusted under 35 U.S.C. 154(b) by 243 days.

(21) Appl. No.: 14/819,885

(22) Filed: Aug. 6, 2015

(65) Prior Publication Data
US 2017/0041858 A1 Feb. 9, 2017

(51) Int. Cl.
| | |
|---|---|
| H04W 48/18 | (2009.01) |
| H04W 40/16 | (2009.01) |
| H04L 12/833 | (2013.01) |
| H04W 48/16 | (2009.01) |
| H04W 40/24 | (2009.01) |

(52) U.S. Cl.
CPC ......... *H04W 48/16* (2013.01); *H04L 47/2458* (2013.01); *H04W 40/248* (2013.01)

(58) Field of Classification Search
CPC .. H04L 47/828; H04L 47/2458; H04W 16/14; H04W 72/1215; H04W 48/16; H04W 40/248; G06F 21/57; G06F 21/06
See application file for complete search history.

(56) References Cited

U.S. PATENT DOCUMENTS

| | | | | |
|---|---|---|---|---|
| 8,036,367 | B2 * | 10/2011 | Baluja | G06Q 30/0601 379/221.02 |
| 9,348,602 | B1 * | 5/2016 | Alapati | G06F 3/06 |
| 2015/0319658 | A1 * | 11/2015 | Padden | H04W 16/14 455/436 |

* cited by examiner

*Primary Examiner* — Ayaz R Sheikh
*Assistant Examiner* — Debebe A Asefa
(74) *Attorney, Agent, or Firm* — Harrity & Harrity, LLP

(57) ABSTRACT

A method may include obtaining a plurality of information subsets from a plurality of provider devices. The plurality of information subsets may be obtained via a receiver network, and the plurality of information subsets may be provided to the plurality of provider devices via a network other than the receiver network. The method may include determining that the plurality of information subsets are included in an information set. The method may include processing the plurality of information subsets to assemble the information set. The method may include determining a result of processing the plurality of information subsets. The method may include providing, by the device, information based on the result of processing the plurality of information subsets.

20 Claims, 13 Drawing Sheets

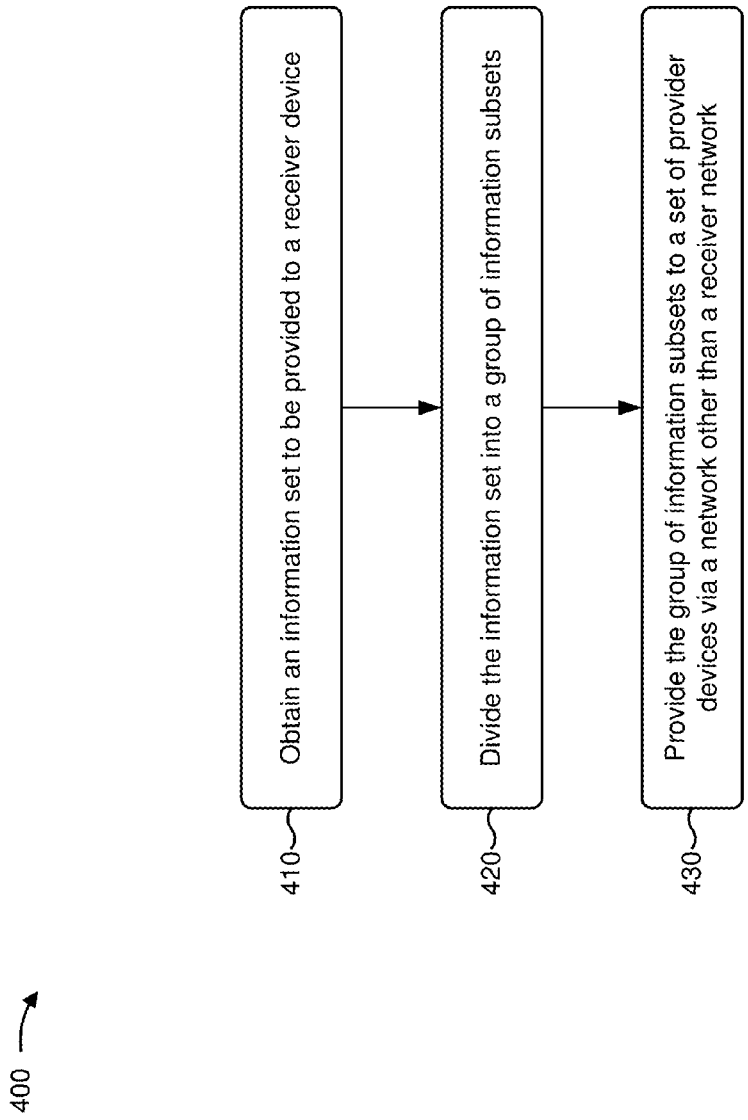

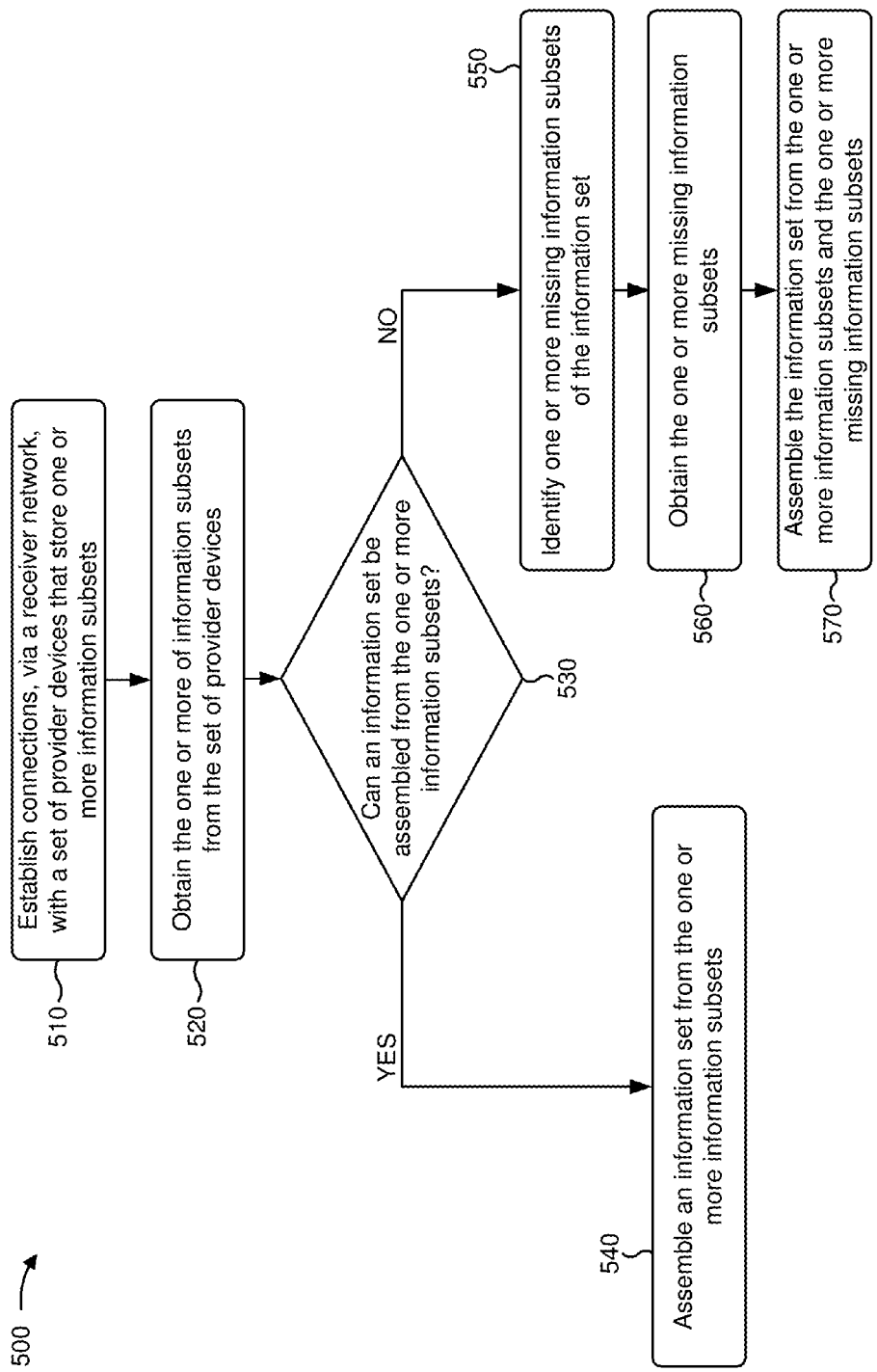

ASYNCHRONOUS INFORMATION TRANSFER BETWEEN DEVICES ON DIFFERENT NETWORKS VIA A PLURALITY OF PROVIDER DEVICES

BACKGROUND

A receiver device, on a first network, may require information (e.g., software updates, media content, operational information, etc.). A coordinator device, on a second network, may attempt to provide the information to the receiver device. However, the coordinator device may not be capable of directly connecting with the receiver device. For example, the second network may be a cellular network and the first network may be a local area network that is isolated from cellular coverage.

SUMMARY

A device may include one or more processors. The one or more processors may obtain an information set to be provided to a receiver device. The receiver device may be associated with a first network, and may have no Internet connectivity. The one or more processors may divide the information set into a plurality of information subsets. The receiver device may determine the information set based on the plurality of information subsets. The one or more processors may identify a plurality of provider devices. The plurality of provider devices may be identified based on the plurality of provider devices possibly connecting with the receiver device via the first network and at a later time than a time when the plurality of information subsets are provided to the plurality of provider devices. The one or more processors may provide the plurality of information subsets to the plurality of provider devices via a second network. Each information subset, of the plurality of information subsets, may be provided to at least one provider device, of the plurality of provider devices, and the first network may be a different network than the second network.

A computer-readable medium may store one or more instructions that, when executed by one or more processors, cause the one or more processors to obtain an information set to be provided to a receiver device. The receiver device may be associated with a first network, and may be associated with no Internet connectivity. The one or more instructions, when executed by the one or more processors, may cause the one or more processors to process the information set to generate a plurality of information subsets. The receiver device may determine the information set based on the plurality of information subsets. The one or more instructions, when executed by the one or more processors, may cause the one or more processors to identify a plurality of provider devices. The plurality of provider devices may be identified based on the plurality of provider devices possibly connecting with the receiver device via the first network and at a later time than a time when the plurality of information subsets are provided to the plurality of provider devices. The one or more instructions, when executed by the one or more processors, may cause the one or more processors to provide the plurality of information subsets to the plurality of provider devices via a second network. Each information subset, of the plurality of information subsets, may be provided to at least one provider device, of the plurality of provider devices, and the first network may not be reachable from the second network. The one or more instructions, when executed by the one or more processors, may cause the one or more processors to cause the plurality of provider devices to provide the plurality of information subsets to the receiver device.

A method may include obtaining a plurality of information subsets from a plurality of provider devices. The plurality of information subsets may be obtained via a receiver network, and the plurality of information subsets may be provided to the plurality of provider devices via a network other than the receiver network. The method may include determining that the plurality of information subsets are included in an information set. The method may include processing the plurality of information subsets to assemble the information set. The method may include determining a result of processing the plurality of information subsets. The method may include providing, by the device, information based on the result of processing the plurality of information subsets.

BRIEF DESCRIPTION OF THE DRAWINGS

FIG. 4 is a flow chart of an example process for providing information via a set of provider devices;

FIG. 5 is a flow chart of an example process for assembling an information set based on information subsets received from a set of provider devices.

DETAILED DESCRIPTION

The following detailed description of example implementations refers to the accompanying drawings. The same reference numbers in different drawings may identify the same or similar elements.

A coordinator device may obtain information to provide to a receiver device. The coordinator device may be associated with a network (e.g., a cellular network, the Internet, a wide area network, etc.). The receiver device may be associated with a receiver network other than the network associated with the coordinator device (e.g., a local area network, a second wide area network, etc.), and may be incapable of connecting with the coordinator device via the receiver network or the network associated with the coordinator device.

Implementations described herein may enable the coordinator device to provide the information to the receiver device by dividing the information into a group of information subsets. The coordinator device may provide each of the group of information subsets to one or more provider devices, of a set of provider devices, via the network associated with the coordinator device. The set of provider devices may move to a location associated with the receiver device and the receiver network, and may provide the group of information subsets to the receiver device, which may assemble the information from the group of information subsets. In this way, the coordinator device may provide information to the receiver device via the set of provider devices, which improves resilience of the information and reduces expense associated with providing the information to the receiver device.

Figure 1:
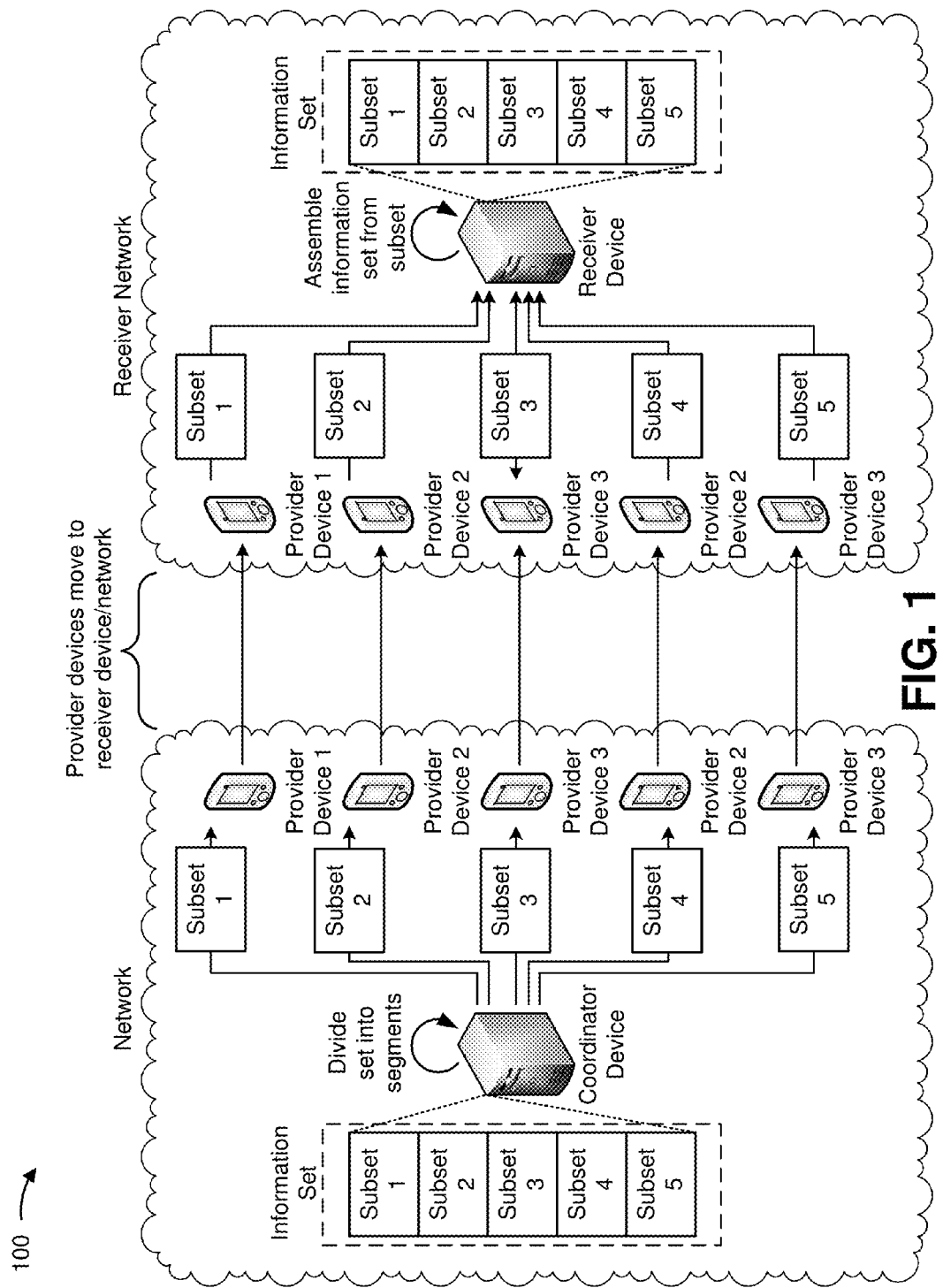
FIG. 1 is a diagram of an overview of an example implementation described herein.

FIG. 1 is a diagram of an overview of an example implementation 100 described herein. As shown in FIG. 1, a coordinator device may obtain an information set, such as a software update for a receiver device. As shown, the coordinator device may divide the information set into five information subsets (e.g., subset 1, subset 2, subset 3, subset 4, and subset 5). As further shown, the coordinator device may provide the five information subsets to five provider devices, which may include, for example, cellular phones, tablet computers, or the like. The coordinator device may provide the five information subsets to the five provider devices based on information indicating that the five provider devices are likely to connect with the receiver device via the receiver network at a later time. In some implementations, the coordinator device may provide an information subset to multiple provider devices, which may increase the likelihood that the information subset is provided to the receiver device and, thus, improves resilience of the information set.

As shown, the five provider devices may move to a location associated with the receiver device and the receiver network. Assume that the receiver device and the receiver network are isolated from the network and the coordinator device. As shown, the receiver device may obtain the five information subsets from the five provider devices, and may assemble the information set from the five information subsets. In this way, the coordinator device may provide the information set to the receiver device via the five provider devices, which simplifies providing of the information, improves resilience of the information set, and reduces expense associated with providing the information set to the receiver device.

Figure 2:
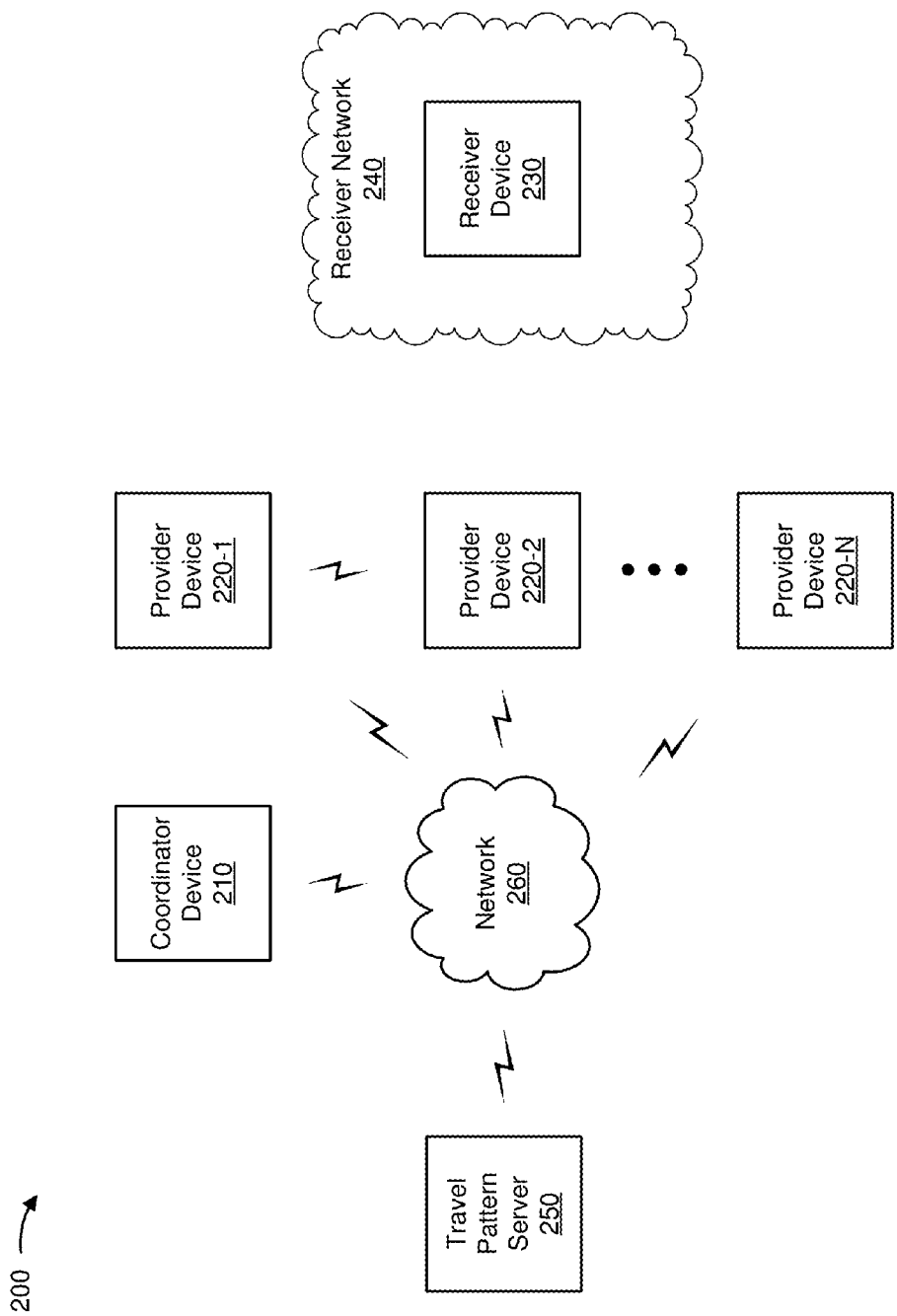
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a coordinator device 210, one or more provider devices 220-1 to 220-N (hereinafter referred to individually as "provider device 220" and collectively as "provider devices 220"), a receiver device 230, a receiver network 240, a travel pattern server 250, and a network 260. Devices of environment 200 may interconnect via wired connections, wireless connections, or a combination of wired and wireless connections.

Coordinator device 210 may include one or more devices capable of receiving, generating, storing, processing, and/or providing information. For example, coordinator device 210 may include a mobile phone (e.g., a smart phone, a radiotelephone, etc.), a laptop computer, a tablet computer, a desktop computer, a handheld computer, a server, or the like. Coordinator device 210 may provide information to and/or receive information from provider devices 220 via network 260.

Provider device 220 may include one or more devices capable of receiving, generating, storing, processing, and/or providing information. For example, provider device 220 may include a mobile phone (e.g., a smart phone, a radiotelephone, etc.), a laptop computer, a tablet computer, a desktop computer, a handheld computer, a gaming device, a smart watch, or the like. Provider device 220 may communicate with one or more devices (e.g., coordinator device 210, receiver device 230, etc.) via one or more networks (e.g., receiver network 240, network 260, etc.).

Receiver device 230 may include one or more devices capable of receiving, generating, storing, processing, and/or providing information. For example, receiver device 230 may include a content provider device, a content server device, a vending machine, a device related to operating a commuter vehicle (e.g., a device on a train, a bus, an airplane, a ship, etc.), a server, or any other type of device that may require updated content or software updates. Receiver device 230 may communicate with provider device 220 and/or other receiver devices 230 via receiver network 240.

Receiver network 240 may include may include one or more wireless networks. For example, receiver network 240 may include a local area network (LAN), or another type of network that has limited coverage (e.g., a WiFi network, a Bluetooth network, a local-area cellular network, a near-field communication network, etc.). In some implementations, receiver network 240 may be provided by receiver device 230.

Travel pattern server 250 may include one or more devices capable of receiving, generating, storing, processing, or providing travel information of provider devices 220. For example, travel pattern server 250 may include one or more servers, or a similar device.

Network 260 may include may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
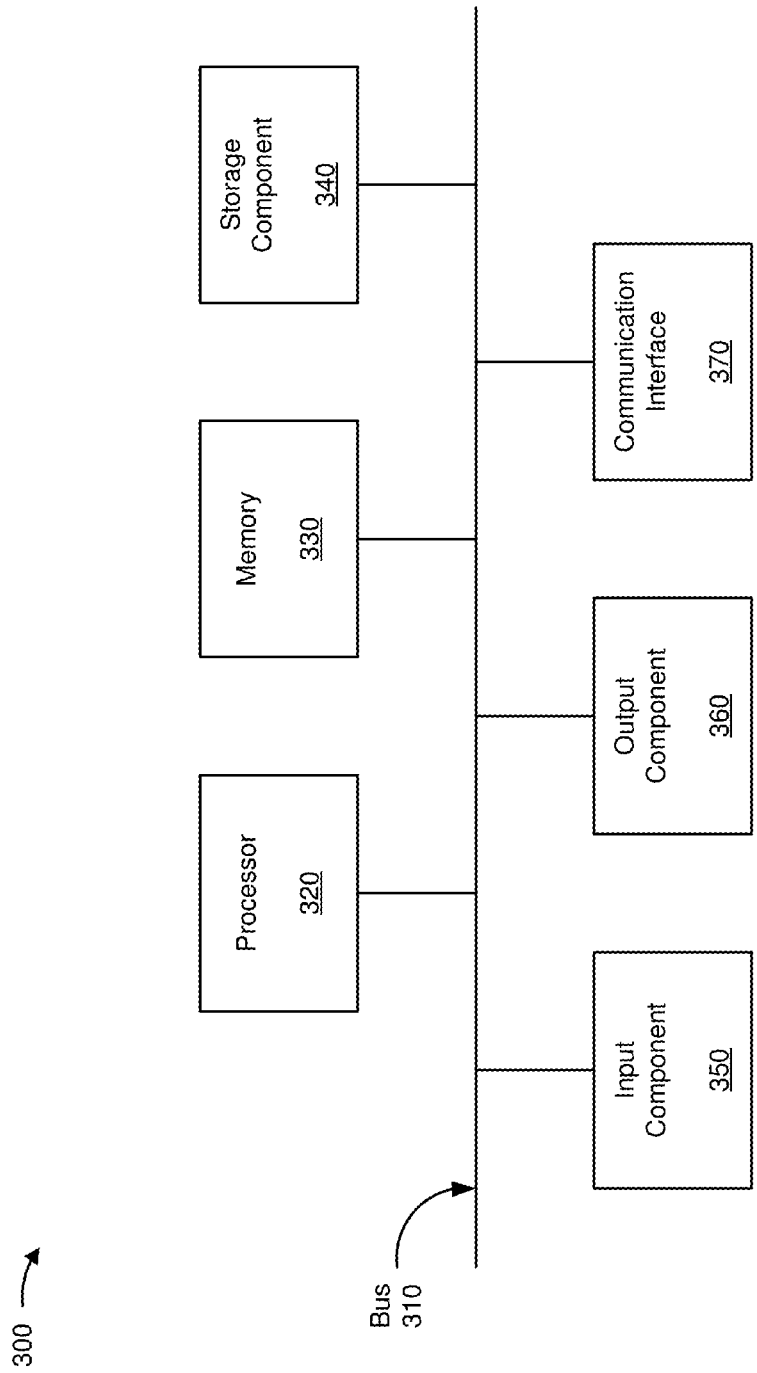
FIG. 3 is a diagram of example components of one or more devices of FIG. 2.

FIG. 3 is a diagram of example components of a device 300. Device 300 may correspond to coordinator device 210, provider device 220, receiver device 230, and/or travel pattern server 250. In some implementations, coordinator device 210, provider device 220, receiver device 230, and/or travel pattern server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing information via a set of provider devices. In some implementations, one or more process blocks of FIG. 4 may be performed by coordinator device 210. In some implementations, one or more process blocks of FIG. 4 may be performed by another device or a group of devices separate from or including coordinator device 210, such as provider device 220 and/or receiver device 230.

As shown in FIG. 4, process 400 may include obtaining an information set to be provided to a receiver device (block 410). For example, coordinator device 210 may obtain an information set to be provided to receiver device 230. In some implementations, coordinator device 210 may obtain the information set from a network administrator. Additionally, or alternatively, coordinator device 210 may generate the information set. For example, coordinator device 210 may determine information (e.g., sensor information, demographic information, etc.), and may generate the information set based on the determined information.

In some implementations, the information set may include media (e.g., video content, audio content, textual content, advertising content, analytic content, etc.), software information (e.g., a software update for receiver device 230, an application for receiver device 230 to run, a hardware update for receiver device 230, etc.), or the like. Additionally, or alternatively, the information set may include information determined by coordinator device 210. For example, coordinator device 210 may include a sensor, a device on a vehicle (e.g., a bus, an airplane, a car, a ship, a subway car, a train, etc.), a security camera, a ticket kiosk, a point-of-sale, or the like, and the information set may relate to operations performed by coordinator device 210.

In some implementations, the information set may relate to operations of receiver device 230. For example, receiver device 230 may be included in a train car, and the information set may include information such as a schedule of the train car, ticketing information, information related to provider devices 220 that may board the train car, content to be provided to user devices on the train car, or the like.

In some implementations, coordinator device 210 may obtain (e.g., locally from memory, from another device, or the like) information related to providing the information set. For example, coordinator device 210 may obtain information identifying a location of one or more receiver devices 230, information identifying two or more receiver devices 230 that can communicate with each other (e.g., via receiver network 240), or the like. As another example, coordinator device 210 may obtain information related to provider device 220. For example, if receiver device 230 is associated with a commuter train, coordinator device 210 may obtain (e.g., locally from memory, from another device, or the like) information identifying a commuting schedule of provider device 220, a commuter ticket associated with provider device 220, locations that provider device 220 commutes to and/or from, receiver networks 240 to which provider device 220 has connected in the past, or the like. In some implementations, coordinator device 210 may obtain some or all of the information related to provider device 220 from a server, such as travel pattern server 250.

As further shown in FIG. 4, process 400 may include dividing the information set into a group of information subsets (block 420). For example, coordinator device 210 may divide the information set into a group of information subsets. In some implementations, coordinator device 210 may divide the information set into a greater quantity of smaller information subsets (e.g., a greater quantity than a lesser quantity, and smaller than larger information subsets), or into a lesser quantity of larger information subsets. By dividing the information set into the greater quantity of smaller information subsets, coordinator device 210 may conserve storage space of provider devices 220. By dividing the information set into the lesser quantity of larger information subsets, coordinator device 210 may reduce a quantity of provider devices 220 needed to provide the lesser quantity of information subsets.

In some implementations, an information subset may include information identifying the information subset. For example, the information subset may include an identifier (e.g., a header, a tag, etc.). The identifier may identify a relative location of the information subset in the group of information subsets (e.g., if the information subset is a second information subset of the group, the identifier may include a character, such as "2"), a size of the information subset, content of the information subset, a group of information subsets to which the information subset belongs, a hash of the information subset, compression information for the information subset, a destination of the information subset, information identifying provider device 220 and/or receiver device 230, or the like.

In some implementations, coordinator device 210 may perform operations on the group of information subsets. For example, coordinator device 210 may apply a hashing algorithm to an information subset to generate a hash based on the information subset. In such cases, coordinator device 210 may provide the hash in association with the information subset, which may permit receiver device 230 to perform a checksum operation to verify integrity of the information subset. Additionally, or alternatively, coordinator device 210 may compress an information subset, which may conserve storage space of provider device 220. Additionally, or alternatively, coordinator device 210 may encrypt an information subset, which may improve security of the information subset.

As further shown in FIG. 4, process 400 may include providing the group of information subsets to a set of provider devices via a network other than a receiver network (block 430). For example, coordinator device 210 may provide the group of information subsets to a set of provider devices 220. Coordinator device 210 may provide the group of information subsets via network 260, which may be a different network than receiver network 240. In some implementations, coordinator device 210 may provide a particular information subset to multiple provider devices 220, which may improve likelihood of receiver device 230 receiving the particular information subset. By providing each information subset, of the group of information subsets, to one or more provider devices 220, coordinator device 210 may provide the information set to receiver device 230 without communicating directly with receiver device 230.

In some implementations, network 260 may include a cellular network, and receiver network 240 may include a local area network (e.g., a wireless local area network, a Bluetooth network, etc.) that is isolated from the cellular network. Additionally, or alternatively, receiver network 240 and network 260 may both include local area networks. Additionally, or alternatively, receiver network 240 may include a cellular network, and network 260 may include a local area network that is isolated from receiver network 240.

Coordinator device 210 may provide the group of information subsets to the set of provider devices 220 based on the set of provider devices 220 being likely to connect with receiver device 230 via receiver network 240. For example, coordinator device 210 may identify a set of provider devices 220 that are destined for a location that includes receiver device 230, may determine that the set of provider devices 220 are likely to connect with receiver network 240 (e.g., based on schedules of the set of provider devices 220, based on a past connection with receiver network 240 by the set of provider devices 220, based on a user of provider device 220 purchasing a ticket related to receiver device 230, based on the set of provider devices 220 downloading an application to function as provider devices 220, etc.), may receive information requesting an information subset from one or more provider devices 220, or the like. Coordinator device 210 may provide particular provider devices 220, of the set of provider devices 220, with particular information subsets based on the likelihood of the particular provider devices 220 connecting with receiver device 230, which improves reliability of provision of the information set.

In some implementations, coordinator device 210 may provide information subsets in a particular order or quantity based on priority levels associated with the information subsets. For example, coordinator device 210 may determine that a first attempt to deliver a particular information subset was unsuccessful, and may thus assign a higher priority level to the particular information subset (e.g., higher than a lower priority level associated with another information subset). Based on the priority level, coordinator device 210 may provide the particular information subset to provider device 220 before providing the other information subset.

As another example, a first information set may be associated with a higher priority level than a second information set. For example, the first information set may include operational information required by a commuter train, and the second information set may include advertisements to be displayed in the commuter train. In such a case, coordinator device 210 may associate information subsets of the first information set with a higher priority level than information subsets of the second information set, and may provide the information subsets of the first information set before providing the information subsets of the second information set. In this way, coordinator device 210 may prioritize information sets and/or information subsets, which reduces resources required to provide particular (e.g., important, urgent, etc.) information sets.

In some implementations, information subsets, of the group of information subsets, may be associated with different sizes. For example, assume that coordinator device 210 divides an information set into two information subsets: a larger information subset and a smaller information subset. In some implementations, coordinator device 210 may select provider devices 220 to which to provide the larger information subset and the smaller information subset. For example, coordinator device 210 may provide the larger information subset to a provider device 220 that is associated with more available storage space, that is more likely to provide the larger information subset to receiver device 230 (e.g., more likely than a provider device 220 that receives the smaller information subset), or the like. In this way, coordinator device 210 may selectively provide information subsets of different sizes, which improves efficiency of provider device 220 when providing the information subsets.

In some implementations, coordinator device 210 may provide information in association with the group of information subsets. For example, if coordinator device 210 performs a hashing operation on the group of information subsets, coordinator device 210 may provide hashes of the group of information subsets, for use by receiver device 230 to perform a checksum operation. As another example, coordinator device 210 may provide a security key for decryption of the group of information subsets, or may provide information relating to decompression of the group of information subsets (e.g., when the group of information subsets is encrypted and/or compressed, respectively).

In some implementations, coordinator device 210 may store a data structure including information related to providing information sets. The data structure may include information identifying receiver device 230, a location associated with receiver device 230 (e.g., a physical location, a route of receiver device 230, one or more other receiver devices 230 associated with the location, etc.), information sets to be provided to receiver device 230, information subsets associated with the information sets to be provided, whether receiver device 230 has obtained each of the information subsets, provider devices 220 associated with receiver device 230, or other information.

Based on the data structure, coordinator device 210 may provide information subsets. For example, if the data structure indicates that a particular receiver device 230 has not received a particular information subset, coordinator device 210 may provide the particular information subset to one or more provider devices 220 that are associated with the particular receiver device 230. As another example, coordinator device 210 may update the data structure based on received information. For example, coordinator device 210 may receive information identifying one or more unreceived information subsets, and may update the data structure to indicate that the unreceived information subsets have not been received.

In some implementations, coordinator device 210 may provide an information subset to a first receiver device 230, and the first receiver device 230 may provide the information subset to a second receiver device 230. For example, coordinator device 210 may determine that provider device 220 is scheduled to communicate with the first receiver device 230, and that the first receiver device 230 is capable of communicating with the second receiver device 230. In such a case, coordinator device 210 may provide the information subset to provider device 220, which may provide the information subset to the first receiver device 230. The first receiver device 230 may provide the information subset to the second receiver device 230. In this way, coordinator device 210 may cause a first receiver device 230 to provide an information subset to a second receiver device 230, which improves efficiency and versatility of the system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for assembling an information set based on information subsets received from a set of provider devices. In some implementations, one or more process blocks of FIG. 5 may be performed by receiver device 230. In some implementations, one or more process blocks of FIG. 5 may be performed by another device or a group of devices separate from or including receiver device 230, such as coordinator device 210 provider device 220, and/or travel pattern server 250.

As shown in FIG. 5, process 500 may include establishing connections, via a receiver network, with a set of provider devices that store one or more information subsets (block 510). For example, receiver device 230 may establish connections with a set of provider devices 220 via receiver network 240. The set of provider devices 220 may store one or more information subsets of an information set. In some implementations, the set of provider devices 220 may store each information subset of the information set. In some implementations, the set of provider devices 220 may be missing one or more information subsets of the information set and/or the set of provider devices 220 may store an unusable information subset (e.g., corrupted, etc.), as described in more detail below. In some implementations, receiver device 230 may establish the connections based on an application associated with the set of provider devices 220. For example, the set of provider devices 220 may use an application (e.g., to access content provided by receiver device 230), and the application may establish the connection with receiver device 230 and/or provide the information subsets.

In some implementations, a first receiver device 230 may establish a connection with a second receiver device 230. For example, two or more receiver devices 230 may be associated with receiver network 240. The two or more receiver devices 230 may require information sets (e.g., the same information set, different information sets, etc.). In such a case, the two or more receiver devices 230 may communicate via receiver network 240 to obtain the information sets, as described in more detail below.

As further shown in FIG. 5, process 500 may include obtaining the one or more information subsets from the set of provider devices (block 520). For example, receiver device 230 may obtain the one or more information subsets from the set of provider devices 220. In some implementations, receiver device 230 may obtain the one or more information subsets based on connecting with the set of provider devices 220. For example, receiver device 230 may be configured to check whether provider device 220 stores an information subset based on receiver device 230 connecting with provider device 220. Additionally, or alternatively, the set of provider devices 220 may be configured to push the one or more information subsets to receiver device 230.

In some implementations, receiver device 230 may receive information identifying an information subset. For example, receiver device 230 may receive a name of an information set that includes the information subset, and a segment number associated with the information subset. Receiver device 230 may determine, based on the name and the segment number, whether receiver device 230 requires the information subset. For example, when receiver device 230 has previously obtained the information subset, or if receiver device 230 does not require an information set that includes the information subset, receiver device 230 may determine not to obtain the information subset. When receiver device 230 has previously obtained a particular information subset, and receives a copy of the particular information subset from provider device 220, receiver device 230 may discard the copy of the particular information subset. When receiver device 230 determines that receiver device 230 requires the information subset, receiver device 230 may obtain the information subset from provider device 220.

In some implementations, a first receiver device 230 may obtain an information subset and/or an information set from a second receiver device 230. For example, receiver devices 230, that store information subsets, may provide information identifying the information subsets to other receiver devices 230 (e.g., via receiver network 240, via a wired connection, etc.). When a particular receiver device 230 requires a particular information subset, the particular receiver device 230 may determine whether one or more of the other receiver devices 230 stores the particular information subset, and may obtain the particular information subset from the one or more other receiver devices 230. In this way, receiver devices 230 may communicate regarding information subsets received from provider devices 220, which improves efficiency of providing the information subsets.

As another example, assume that a first train includes three train cars, each including a respective receiver device 230-1 through 230-3. Assume further that a second train includes three train cars, each including a respective receiver device 230-4 through 230-6. Receiver devices 230-1 through 230-6 may receive information subsets of a group of information sets from provider devices 220, and may determine that one or more required information subsets are missing. For example, receiver device 230-1 may determine that receiver device 230-1 requires a first information subset, receiver device 230-4 may determine that receiver device 230-4 requires a second information subset, and so on.

When the first train and the second train are both at a particular location (e.g., a train station with receiver network 240), the first train and the second train may provide missing information subsets to each other. For example, receiver device 230-1 may receive the first information subset from another receiver device 230-2, 230-3, etc. that has obtained the first information set from provider device 220, and receiver device 230-4 may receive the second information subset from another receiver device 230-1, 230-2, etc. that has obtained the second information subset from provider device 220. Based on whether receiver devices 230-1 through 230-6 obtain each missing information subset, receiver devices 230-1 through 230-6 may provide information to one or more provider devices 220 (e.g., information identifying one or more missing information subsets, information indicating that each missing information subset was obtained, etc.).

In some implementations, receiver device 230 may apply an algorithm to the one or more information subsets. For example, if receiver device 230 receives a hash in association with an information subset, receiver device 230 may apply a checksum operation, based on the hash, to verify integrity of the information subset. As another example, if receiver device 230 receives compression information in association with the information subset, receiver device 230 may apply a decompression algorithm to the information subset. As yet another example, if receiver device 230 receives decryption information in association with the information subset (e.g., a security key, etc.), receiver device 230 may decrypt the information subset based on the decryption information.

As further shown in FIG. 5, process 500 may include determining whether an information set can be assembled from the one or more information subsets (block 530). For example, receiver device 230 may determine whether an information set can be assembled from the one or more information subsets. In some implementations, receiver device 230 may determine whether the information set can be assembled based on information associated with the one or more information subsets. For example, the information may indicate an order of the one or more information subsets, a quantity of information subsets in the information set, or the like, and receiver device 230 may determine whether one or more information subsets are missing based on the information.

As further shown in FIG. 5, if an information set can be assembled from the one or more information subsets (block 530—YES), process 500 may include assembling an information set from the one or more information subsets (block 540). For example, if an information set can be assembled from the one or more information subsets obtained from the set of provider devices 220, receiver device 230 may assemble the information set. In some implementations, receiver device 230 may assemble the information set based on information associated with the one or more information subsets. For example, the information may indicate an order of the one or more information subsets, a compression algorithm of the one or more information subsets, or the like, and receiver device 230 may assemble the information set accordingly. In some implementations, receiver device 230 may perform an action based on assembling the information set. For example, receiver device 230 may perform a software update, may provide content of the information set to a user device, may store and/or process information related to user devices and/or provider devices 220, may provide content of the information set to another receiver device 230 (e.g., where the first receiver device 230 may be associated with a train station, and the other receiver device 230 may be associated with a train, etc.), or the like.

As further shown in FIG. 5, if an information set cannot be assembled from the one or more information subsets (block 530—NO), process 500 may include identifying one or more missing information subsets of the information set (block 550). For example, receiver device 230 may determine that a particular information subset required to assemble the information set is missing. In some cases, one or more provider devices 220 that store the particular information subset may not connect with receiver network 240, and receiver device 230 may not receive the particular information subset. For example, the one or more provider devices 220 may not move to a location that includes receiver device 230 and/or receiver network 240, may not consent to connect with receiver network 240, or the like.

Additionally, or alternatively, one or more missing information subsets may be unusable. For example, receiver device 230 may receive an information subset, may perform a checksum operation based on a hash associated with the information subset, and may determine that the information subset is unusable (e.g., corrupted, incomplete, etc.).

As further shown in FIG. 5, process 500 may include obtaining the one or more missing information subsets (block 560). For example, receiver device 230 may request the one or more missing information subsets from coordinator device 210. In some implementations, receiver device 230 may provide missing subset information, that identifies the one or more missing information subsets, to one or more provider devices 220. The one or more provider devices 220 may provide the missing subset information to coordinator device 210 (e.g., based on an application programming interface instruction, via network 260, after moving away from receiver network 240, etc.).

Based on the missing subset information, coordinator device 210 may provide the one or more missing information subsets to one or more provider devices 220. For example, coordinator device 210 may determine that the one or more provider devices 220 are likely to connect with receiver device 230 at a later time (e.g., based on the one or more provider devices 220 being associated with provider device travel patterns that are associated with receiver device 230, etc.), and may accordingly provide the one or more missing information subsets to the one or more provider devices 220. In some implementations, coordinator device 210 may provide a missing information subset to multiple provider devices 220, which increases a likelihood of receiver device 230 receiving the missing information subset.

In some implementations, receiver device 230 may provide information, to a provider device 220, related to operation of a location that includes receiver device 230. For example, if receiver device 230 is included in a train car, receiver device 230 may provide information identifying a quantity of passengers on the train car, acceleration and/or deceleration of the train car, technical issues with the train car (e.g., based on user reports, based on sensors associated with the train car, based on information provided by a conductor of the train car, etc.), information identifying provider devices 220 with which receiver device 230 communicates, information identifying user interaction with content provided by provider device 220, information related to user accounts for accessing content provided by provider device 220, or the like. Provider device 220 may provide the information to coordinator device 210. Coordinator device 210 may use the information to perform analytics related to operation of the location. For example, coordinator device 210 may determine whether acceleration of the location satisfies a threshold, whether a quantity of passengers satisfies a threshold, whether a technical issue occurs with regard to the location, provider devices 220 associated with the location, or the like, and may perform an action with regard to the location accordingly (e.g., may record information related to an operator of the location, may provide information to travel pattern server 250, may update a locally store data structure, etc.).

As further shown in FIG. 5, process 500 may include assembling the information set from the one or more information subsets and the one or more missing information subsets (block 570). For example, the one or more provider devices 220 may provide the one or more missing information subsets to receiver device 230 (e.g., via receiver network 240), and receiver device 230 may assemble the information set from the one or more information subsets and the one or more missing information subsets. In this way, receiver device 230 may obtain a missing information subset by communicating with coordinator device 210 via provider device 220, which permits receiver device 230 to obtain the missing information subset without connecting with coordinator device 210 and, thus, improves reliability of the information set.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6H are diagrams of an example implementation 600 relating to example process 400 shown in FIG. 4, and relating to example process 500 shown in FIG. 5. FIGS. 6A-6H show an example of providing an information set to a receiver device via a set of provider devices.

Figure 6A:
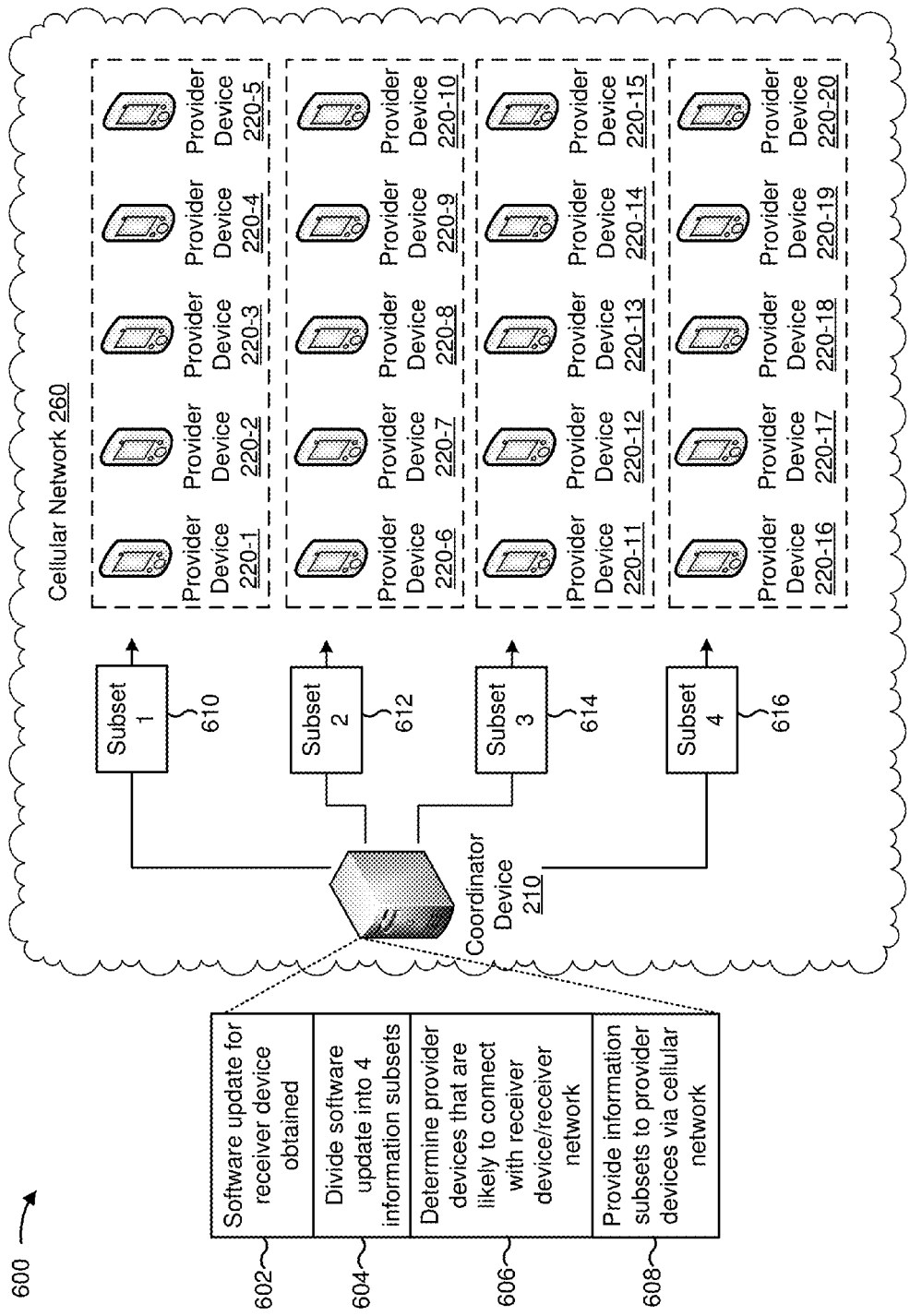
FIGS. 6A-6H are diagrams of an example implementation relating to the example processes shown in FIGS. 4 and 5.

As shown in FIG. 6A, and by reference number 602, coordinator device 210 may obtain an information set (e.g., a software update) to be provided to receiver device 230. As shown by reference number 604, coordinator device 210 may divide the software update into four information subsets (e.g., information subset 1, information subset 2, information subset 3, and information subset 4).

As shown by reference number 606, coordinator device 210 may determine a set of provider devices 220 that are likely to connect with receiver device 230 via receiver network 240. Assume that coordinator device 210 determines the set of provider devices 220 by obtaining past location information, associated with the set of provider devices 220, from travel pattern server 250. As shown by reference number 608, coordinator device 210 may provide the information subsets to provider devices 220 via cellular network 260.

As shown by reference number 610, coordinator device 210 provides information subset 1 to provider devices 220-1 through 220-5. As shown by reference number 612, coordinator device 210 provides information subset 2 to provider devices 220-6 through 220-10. As shown by reference number 614, coordinator device 210 provides information subset 3 to provider devices 220-11 through 220-15. As shown by reference number 616, coordinator device 210 provides information subset 4 to provider devices 220-16 through 220-20. By providing each of the information subsets to multiple provider devices 220, coordinator device 210 increases a likelihood that receiver device 230 will receive each of the information subsets.

Figure 6B:
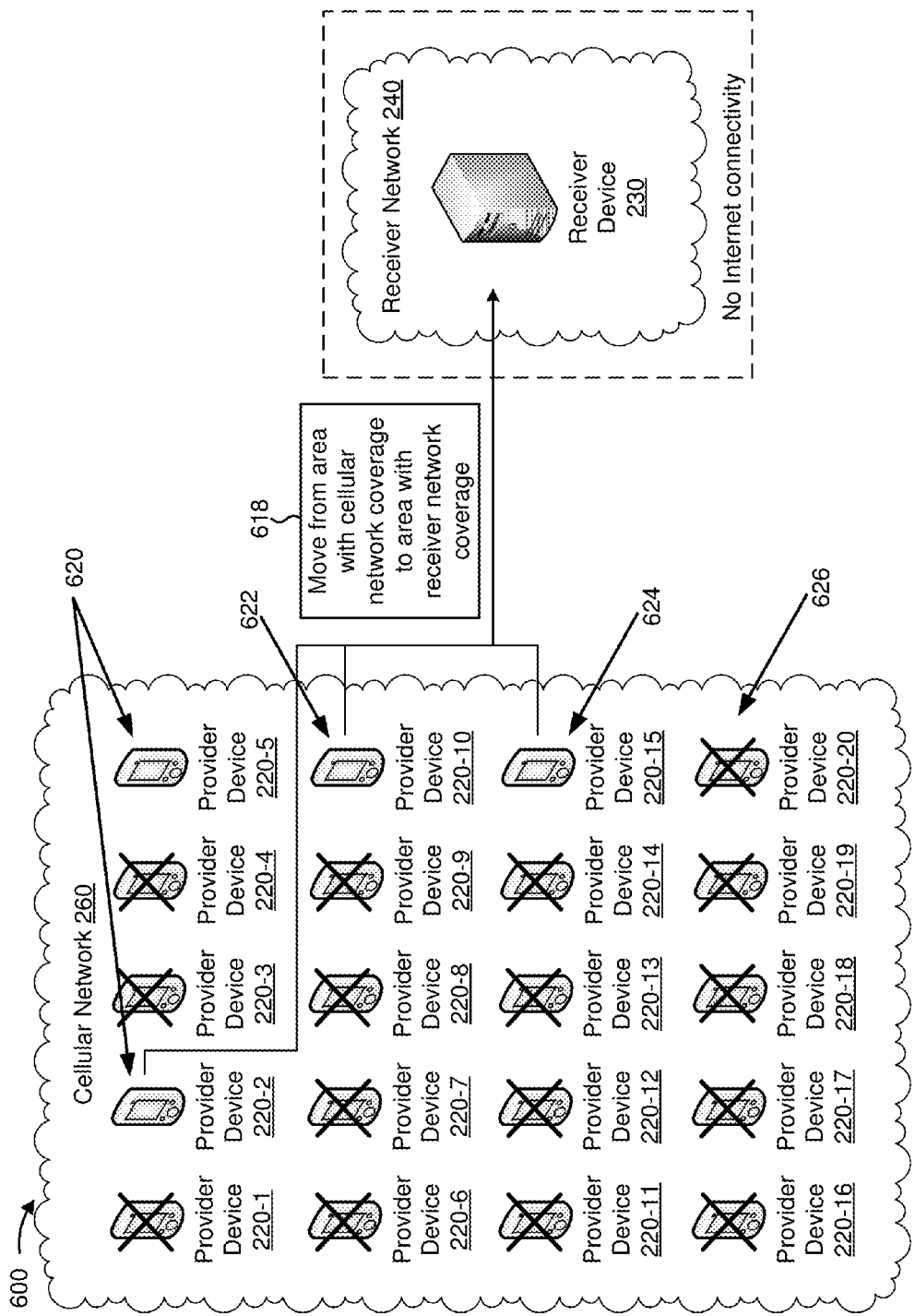

As shown in FIG. 6B, receiver device 230 and receiver network 240 may be located in a location with no Internet conectivity. Therefore, coordinator device 210 may be incapable of providing the software update directly to receiver device 230. As shown by reference number 618, some of provider devices 220-1 through 220-20 move to a location that includes receiver device 230 and receiver network 240. As shown by reference number 620, of provider devices 220 that received information subset 1, provider device 220-2 and provider device 220-5 move to the location.

As shown by reference number 622, of provider devices 220 that received information subset 2, provider device 220-10 moves to the location. As shown by reference number 624, of provider devices 220 that received information subset 3, provider device 220-15 moves to the location. As shown by reference number 626, of provider devices 220 that received information subset 4, no provider device 220 moves to the location.

Figure 6C:
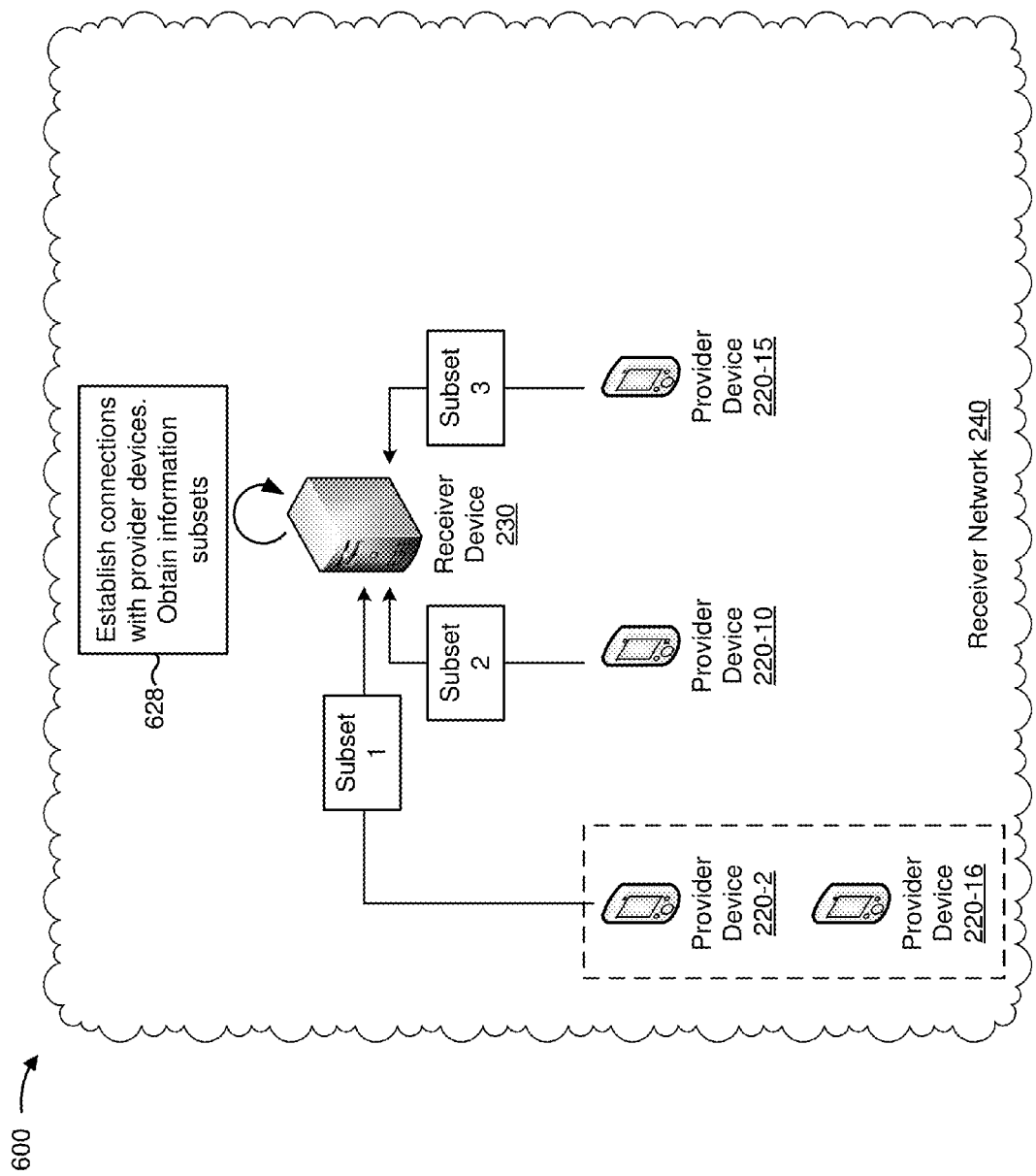

As shown in FIG. 6C, and by reference number 628, receiver device 230 may establish connections with provider devices 220 at the location via receiver network 240. As further shown, receiver device 230 may obtain the information subsets from provider devices 220. As shown, receiver device 230 obtains information subset 1 from provider device 220-2 and/or provider device 220-5, obtains information subset 2 from provider device 220-10, and obtains information subset 3 from provider device 220-15. As further shown, receiver device 230 does not obtain information subset 4.

Figure 6D:
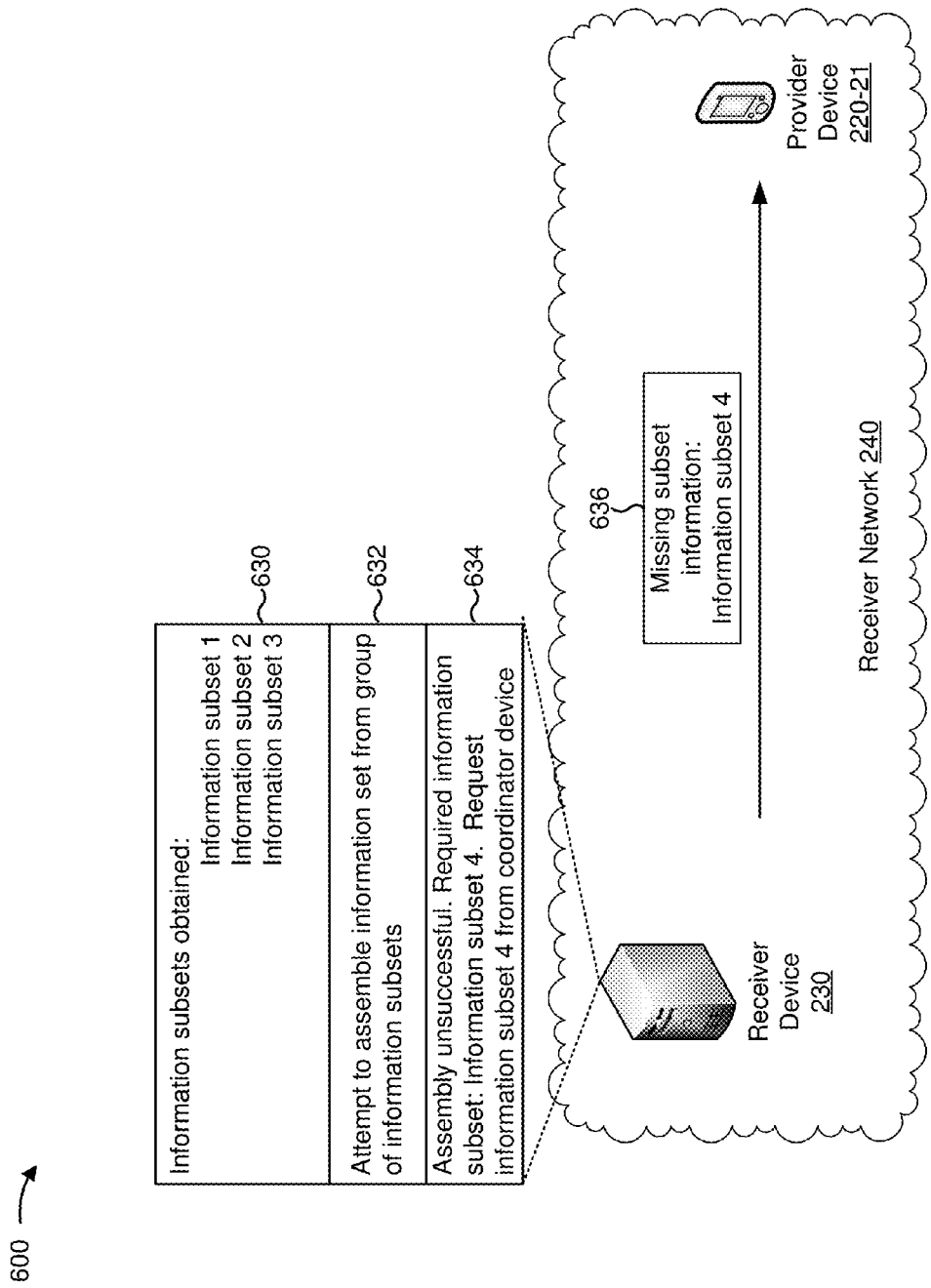

As shown in FIG. 6D, and by reference number 630, receiver device 230 may determine that receiver device 230 obtained information subsets 1, 2, and 3 from provider devices 220. As shown by reference number 632, receiver device 230 may attempt to assemble the information set (e.g., the software update) from information subsets 1, 2, and 3. Assume that information subsets 1-4 include identifiers that permit receiver device 230 to assemble the information set. For example, the identifiers may identify a relative order of the information subsets and/or operations to perform to reassemble the information subsets. As shown by reference number 634, receiver device 230 may determine that receiver device 230 is incapable of assembling the information set. As further shown, receiver device 230 may determine that receiver device 230 requires information subset 4 to assemble the information set, and may determine to request information subset 4 from coordinator device 210.

As shown by reference number 636, receiver device 230 may provide missing subset information to provider device 220-21. As further shown, the missing subset information may identify information subset 4. As shown, receiver device 230 may provide the missing subset information via receiver network 240.

Figure 6E:
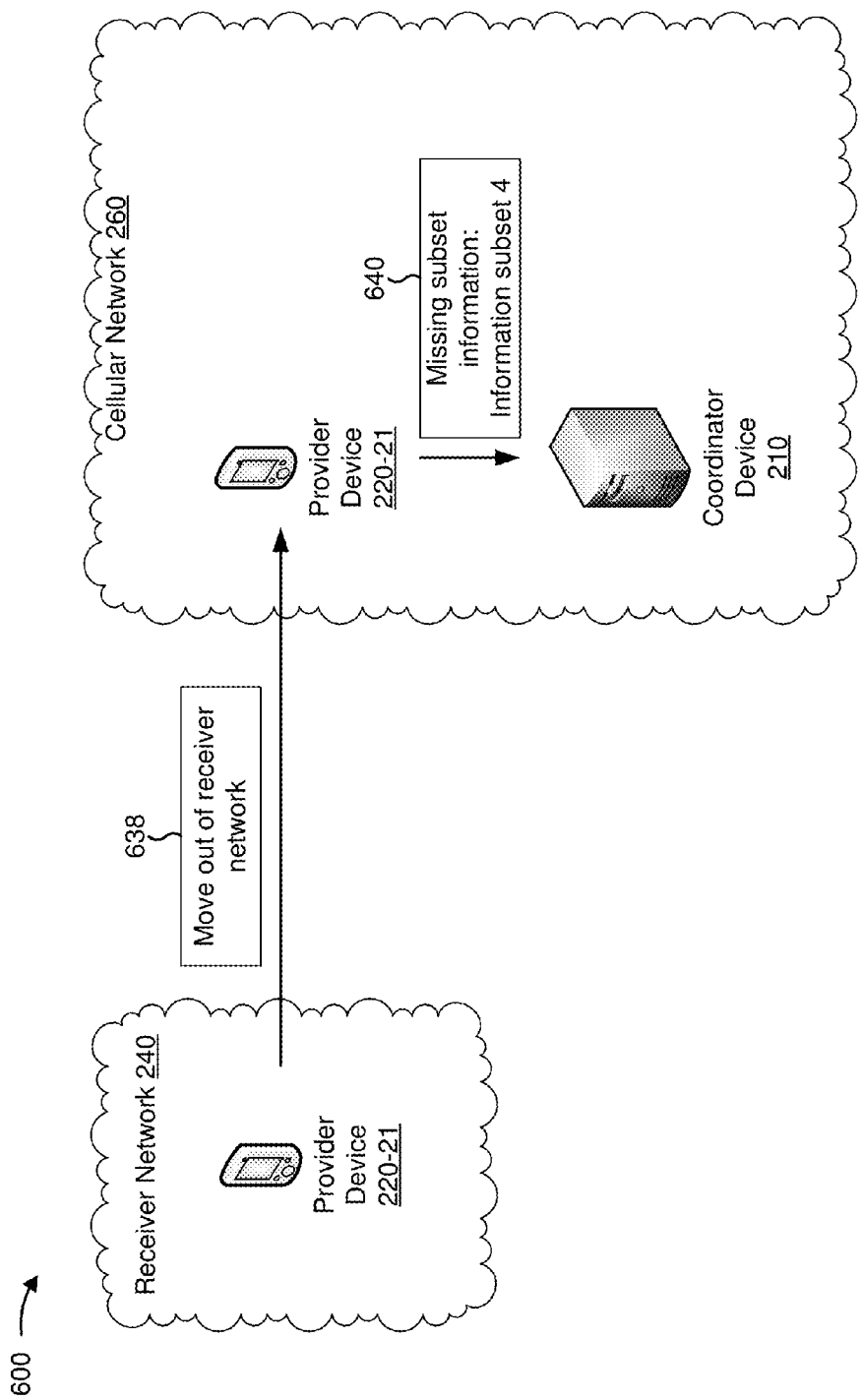

As shown in FIG. 6E, and by reference number 638, provider device 220-21 may move out of receiver network

240. As further shown, provider device 220-21 may move to a location that is covered by cellular network 260. As shown by reference number 640, provider device 220-21 may provide the missing subset information, identifying information subset 4, to coordinator device 210.

Figure 6F:
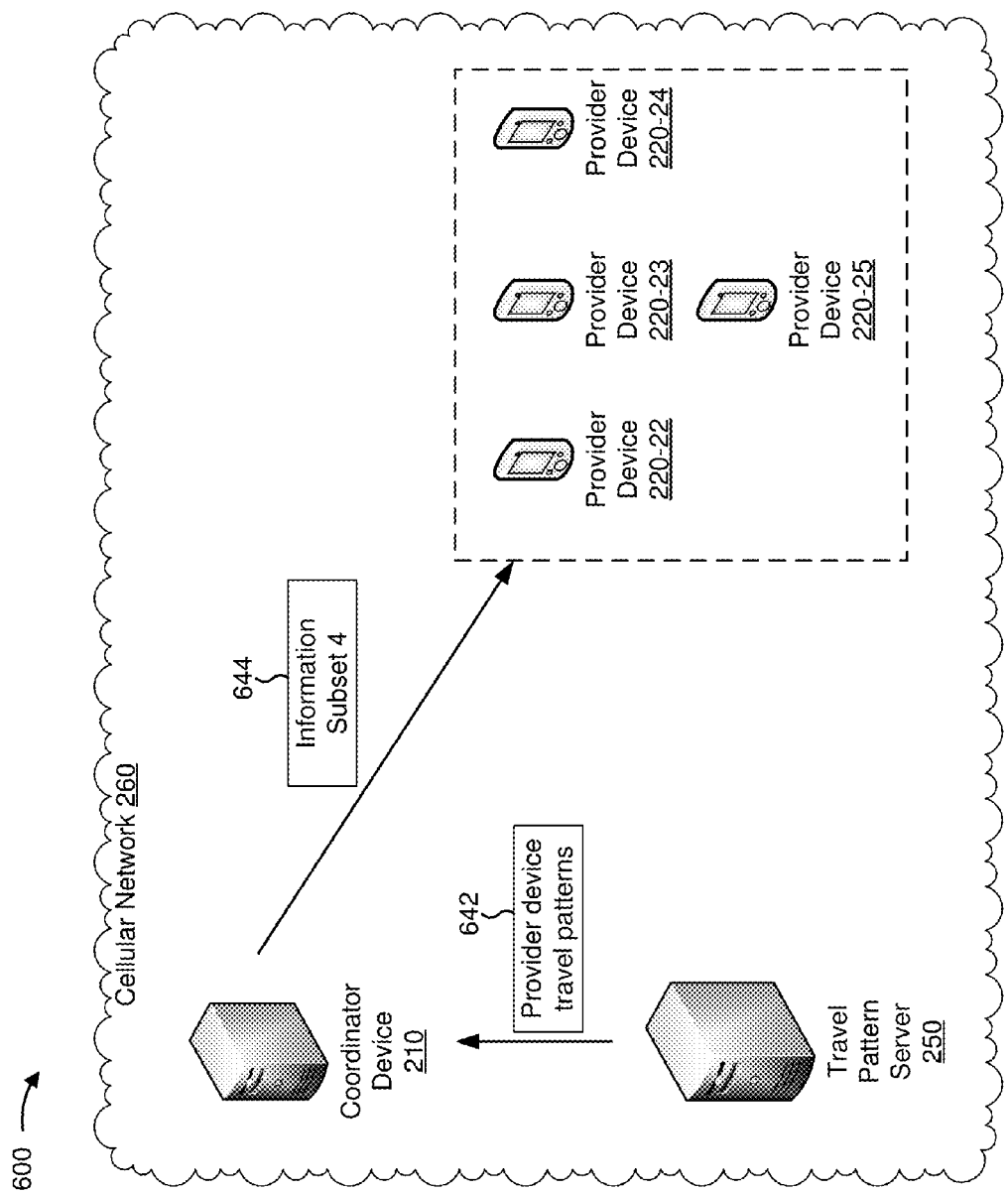

As shown in FIG. 6F, and by reference number 642, coordinator device 210 may obtain provider device travel patterns from travel pattern server 250. Based on the provider device travel patterns, coordinator device 210 may determine one or more provider devices 220 to which to provide information subset 4, based on the one or more provider devices 220 possibly connecting with receiver device 230 and/or receiver network 240 at a later time. Here, coordinator device 210 identifies provider devices 220-22 through 220-25. As shown by reference number 644, coordinator device 210 provides information subset 4 to provider devices 220-22 through 220-25.

Figure 6G:
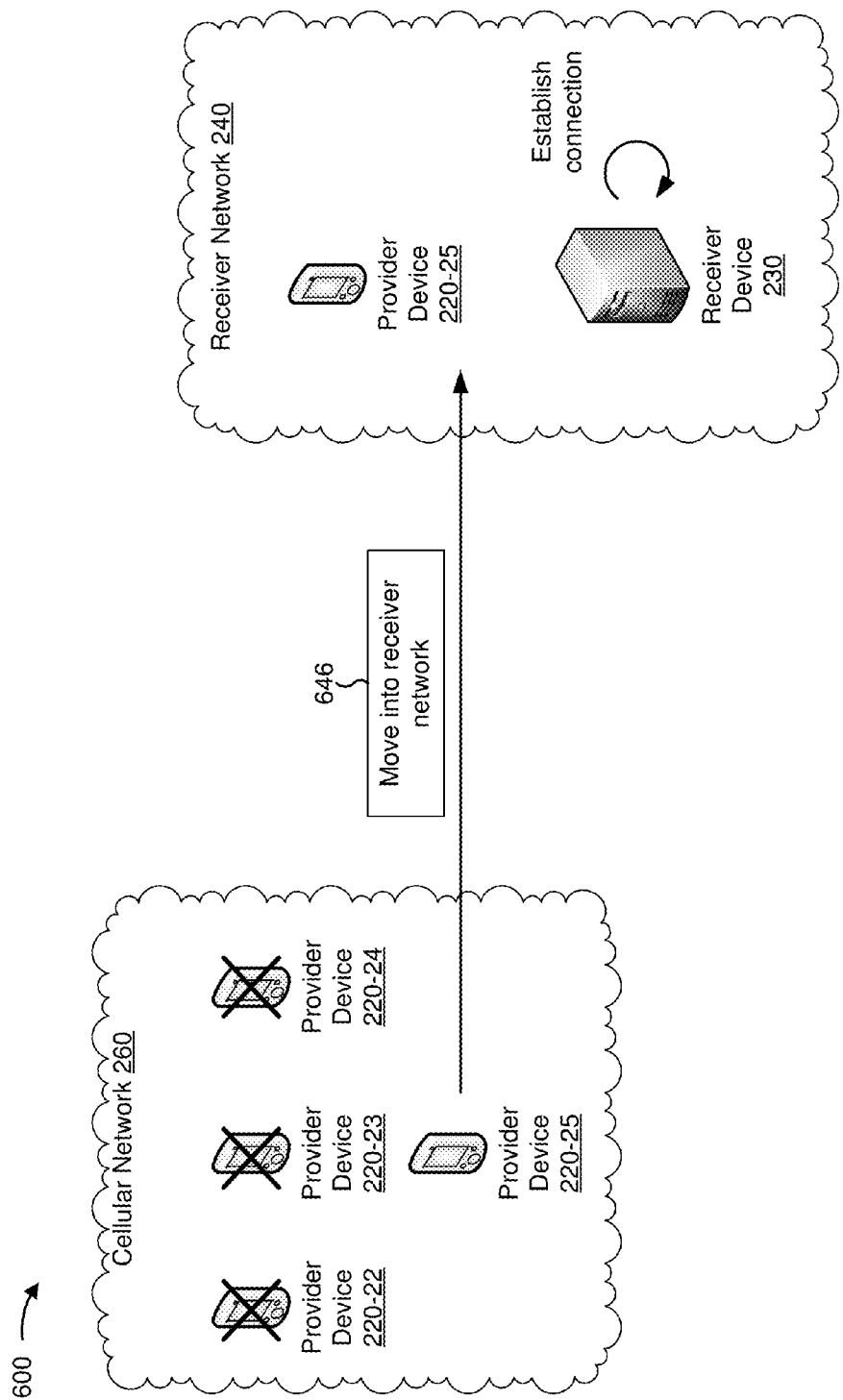

As shown in FIG. 6G, provider devices 220-22, 220-23, and 220-24 may not move to receiver device 230 and/or receiver network 240. As shown by reference number 646, provider device 220-25 moves into receiver network 240. As further shown, receiver device 230 may establish a connection with provider device 220-25.

Figure 6H:
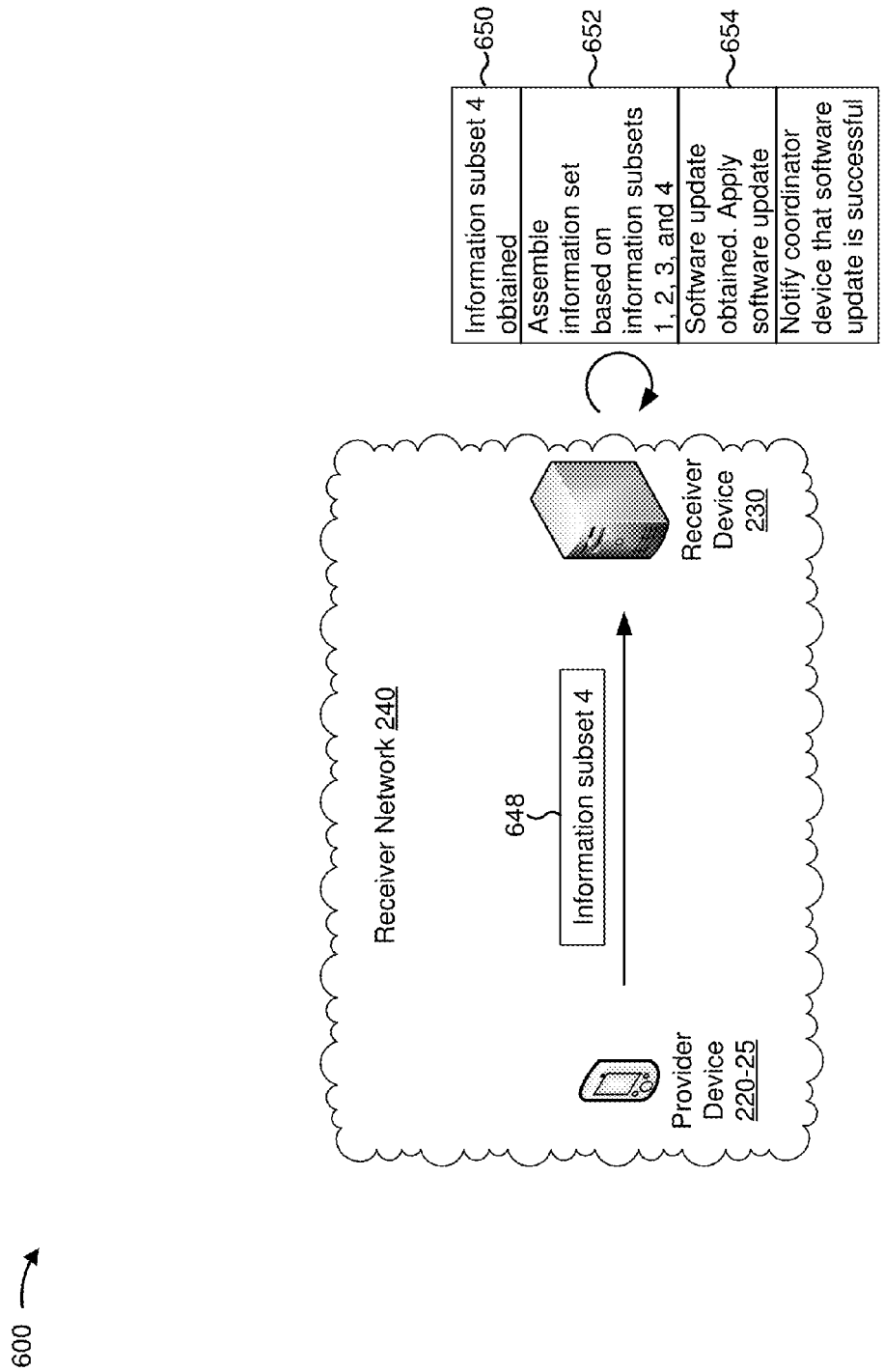

As shown in FIG. 6H, and by reference number 648, provider device 220-25 may provide information subset 4 to receiver device 230 via receiver network 240. As shown by reference number 650, receiver device 230 may obtain information subset 4. As shown by reference number 652, receiver device 230 may assemble the information set from information subsets 1, 2, 3, and 4. As shown by reference number 654, receiver device 230 may apply the software update included in the information set. As further shown, receiver device 230 may notify coordinator device 210 that the software update is successful (e.g., by providing information to one or more provider devices 220, etc.). In this way, receiver device 230 may obtain an information set (e.g., a software update) from a coordinator device without connecting with the coordinator device via a network, using a set of provider devices 220.

As indicated above, FIGS. 6A-6H are provided merely as an example. Other examples are possible and may differ from what was described with regard to FIGS. 6A-6H.

In this way, the coordinator device may provide information to the receiver device via the set of provider devices, which improves resilience of the information and reduces expense associated with providing the information to the receiver device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

To the extent that implementations described herein collect, store, or use personal information provided by individuals, it should be understood that such information shall be used in accordance with all applicable laws concerning protection of personal information. Storage and use of personal information may be in an appropriately secure manner commensurate with the type of information, for example, through various encryption and anonymization techniques for particularly sensitive information. Additionally, the collection, storage, and employment of such personal information may be subject to consent of the individual to such activities, for example, through well known "opt-in" or "opt-out" processes as may be appropriate for the situation and type of personal information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
obtain an information set to be provided to a receiver device,
the receiver device being associated with a first network,
the device being associated with a second network that is different than the first network, and
the receiver device and the first network being incapable of connecting with the device;
divide the information set into a plurality of information subsets;
identify a plurality of intermediary devices,
the plurality of intermediary devices being a plurality of provider devices identified based on:
the plurality of provider devices being capable of establishing a connection with the receiver device at a second time via the first network,
the second time being a later time than a first time when the plurality of information subsets are provided, by the device, to the plurality of intermediary devices, and the receiver device and the first network being incapable of connecting with the device;
provide, at the first time, the plurality of information subsets to the plurality of intermediary devices via the second network, each information subset, of the plurality of information subsets, being provided to at least one intermediary device, of the plurality of intermediary devices, the plurality of intermediary devices being physically re-located to a location associated with the first network at the second time, and providing the plurality of information subsets to the receiver device via the first network based on being physically re-located to the location associated with the first network, and the receiver device assembling the plurality of information subsets;

receive missing subset information indicating that one or more particular information subsets, of the plurality of information subsets, are missing at the receiver device; and provide, at a third time later than the second time, the one or more particular information subsets to one or more intermediary devices via the second network, the one or more intermediary devices being physically re-located to the location associated with the first network at a fourth time later than the third time and providing the one or more particular information subsets to the receiver device, and the information set being assembled at the receiver device using the one or more particular information subsets.

2. The device of claim 1, where the one or more processors are further to:

configure the plurality of intermediary devices to provide the plurality of information subsets to the receiver device.

3. The device of claim 1, where the one or more intermediary devices are separate from the plurality of intermediary devices.

4. The device of claim 1, where the plurality of intermediary devices is a first plurality of intermediary devices; and where the one or more processors, when providing the plurality of information subsets, are to:

provide the plurality of information subsets to the first plurality of intermediary devices based on the first plurality of intermediary devices being more likely to connect with the receiver device than a second plurality of intermediary devices.

5. The device of claim 1, where the first network is isolated from cellular coverage; and where the second network includes a cellular network.

6. The device of claim 1, where the information set is a first information set;

where the plurality of information subsets is a first plurality of information subsets; and where the one or more processors are further to:

receive a second plurality of information subsets from the plurality of intermediary devices, the second plurality of information subsets originating from the receiver device; and assemble the second plurality of information subsets into a second information set.

7. The device of claim 1, where a first information subset, of the plurality of information subsets, is a larger subset, and a second information subset, of the plurality of information subsets, is a smaller subset, the larger subset including more information than the smaller subset;

where the one or more processors are further to:

determine that a first intermediary device, of the plurality of intermediary devices, is more likely to connect with the receiver device than a second intermediary device, of the plurality of intermediary devices; and where the one or more processors, when providing the plurality of information subsets, are to:

provide the larger subset to the first intermediary device.

8. A non-transitory computer-readable medium storing instructions, the instructions comprising:

one or more instructions that, when executed by one or more processors of a device, cause the one or more processors to:

obtain an information set to be provided to a receiver device, the receiver device being associated with a first network, the device being associated with a second network that is different than the first network, and the receiver device and the first network being incapable of connecting with the device;

process the information set to generate a plurality of information subsets;

identify a plurality of intermediary devices, the plurality of intermediary devices being a plurality of provider devices identified based on:

the plurality of provider devices being capable of establishing a connection with the receiver device at a second time via the first network, the second time being a later time than a first time when the plurality of information subsets are provided, by the device, to the plurality of intermediary devices, and the receiver device and the first network being incapable of connecting with the device;

provide, at the first time, the plurality of information subsets to the plurality of intermediary devices via the second network, each information subset, of the plurality of information subsets, being provided to at least one intermediary device, of the plurality of intermediary devices;

cause the plurality of intermediary devices to provide the plurality of information subsets to the receiver device via the first network based on the plurality of intermediary devices being physically re-located to a location associated with the first network at the second time, the receiver device assembling the plurality of information subsets;

receive missing subset information indicating that one or more particular information subsets, of the plurality of information subsets, are missing at the receiver device;

provide, at a third time later than the second time, the one or more particular information subsets to one or more intermediary devices via the second network; and cause the one or more intermediary devices to provide the one or more particular information subsets to the receiver device based on the one or more intermediary devices being physically re-located to the location associated with the first network at a fourth time later than the third time, the information set being assembled at the receiver device using the one or more particular information subsets.

9. The non-transitory computer-readable medium of claim 8, where the one or more instructions, when executed by the one or more processors, further cause the one or more processors to:
perform a hashing operation on the plurality of information subsets to generate a plurality of hashes; and
provide, in association with the plurality of information subsets, the plurality of hashes to the plurality of intermediary devices via the second network,
the plurality of intermediary devices providing the plurality of hashes to the receiver device via the first network, and
the plurality of hashes permitting the receiver device to perform checksum operations on the plurality of information subsets.

10. The non-transitory computer-readable medium of claim 8, where the information set is a first information set and where the plurality of information subsets is a first plurality of information subsets;
where the one or more instructions, that executed by the one or more processors, further cause the one or more processors to:
determine a first priority level associated with the first information set and a second priority level associated with a second information set,
the first priority level being a higher priority level than the second priority level; and
where the one or more instructions, that cause the one or more processors to provide the first plurality of information subsets, cause the one or more processors to:
provide the first plurality of information subsets, before providing a second plurality of information subsets associated with the second information set, based on the first priority level.

11. The non-transitory computer-readable medium of claim 10, where the one or more instructions, that cause the one or more processors to provide the first plurality of information subsets, further cause the one or more processors to:
perform an action based on the first priority level and the second priority level, the action including at least one of:
providing one or more first subsets, of the first plurality of information subsets, before providing one or more second subsets, of the second plurality of information subsets, or
providing the one or more first subsets to a greater quantity of the plurality of intermediary devices than the one or more second subsets.

12. The non-transitory computer-readable medium of claim 8, where the plurality of information subsets is a first plurality of information subsets; and
where the one or more instructions, when executed by the one or more processors, further cause the one or more processors to:
receive information identifying a second plurality of information subsets from the plurality of intermediary devices,
the information identifying the second plurality of information subsets originating from the receiver device; and
process the information identifying second plurality of information subsets to determine a second information set.

13. The non-transitory computer-readable medium of claim 8, where the plurality of intermediary devices include the one or more intermediary devices.

14. The non-transitory computer-readable medium of claim 8, where the plurality of intermediary devices is a first plurality of intermediary devices; and
where the one or more instructions, that cause the one or more processors to provide the plurality of information subsets, cause the one or more processors to:
provide the plurality of information subsets to the first plurality of intermediary devices based on the first plurality of intermediary devices being more likely to connect with the receiver device than a second plurality of intermediary devices.

15. A method, comprising:
obtaining, by a receiver device, a plurality of information subsets from a plurality of intermediary devices,
the plurality of information subsets being obtained via a first network based on the plurality of intermediary devices being physically re-located to a location associated with the first network at a second time,
the plurality of information subsets being provided, by a device, to the plurality of intermediary devices at a first time via a second network that is different than the first network,
the second time being later than the first time, and
the receiver device and the first network being incapable of connecting with the device;
determining, by the receiver device, that the plurality of information subsets are included in an information set;
processing, by the receiver device, the plurality of information subsets;
determining, by the receiver device and based on processing the plurality of information subsets, that one or more particular information subsets, of the plurality of information subsets, are missing;
providing, by the receiver device, missing subset information indicating that the one or more particular information subsets are missing;
receiving, by the receiver device, the one or more particular information subsets from one or more intermediary devices via the first network based on the one or more intermediary devices being physically re-located to the location associated with the first network; and
processing, by the receiver device, the one or more particular information subsets to assemble the information set.

16. The method of claim 15, where processing the plurality of information subsets comprises:
determining that one or more required information subsets, of the plurality of information subsets, are unusable,
the one or more required information subsets being required to assemble the information set; and
where the method further comprises:
providing information identifying the one or more required information subsets.

17. The method of claim 15, where the receiver device is a first receiver device; and
where the method comprises:
providing an information subset, of the plurality of information subsets, to a second receiver device,
the second receiver device requiring the information subset to assemble the information set.

18. The method of claim 15, further comprising:
receiving a plurality of hashes corresponding to the plurality of information subsets; and applying a checksum operation to the plurality of information subsets based on the plurality of hashes.

19. The method of claim 15, further comprising:
receiving information identifying the plurality of information subsets,
   the information identifying the plurality of information subsets being related to assembling the information set from the plurality of information subsets; and
assembling the information set from the plurality of information subsets based on the information identifying the plurality of information subsets.

20. The method of claim 15, where the receiver device is a first receiver device; and
where the method further comprises:
   determining that a required information subset is not included in the plurality of information subsets,
      the required information subset being included in the information set; and
   obtaining, from a second receiver device and via the first network, the required information subset,
      the second receiver device obtaining the required information subset from an intermediary device that is not included in the plurality of intermediary devices.

* * * * *